United States Patent
Kosugi et al.

(10) Patent No.: US 10,166,822 B2
(45) Date of Patent: Jan. 1, 2019

(54) TIRE POSITION DETERMINATION SYSTEM

(71) Applicant: PACIFIC INDUSTRIAL CO., LTD., Gifu-ken (JP)

(72) Inventors: Masanori Kosugi, Aichi (JP); Takao Araya, Gifu-ken (JP); Koji Okumura, Gifu-ken (JP)

(73) Assignee: PACIFIC INDUSTRIAL CO., LTD., Gifu-ken (JP)

( * ) Notice: Subject to any disclaimer, the term of this patent is extended or adjusted under 35 U.S.C. 154(b) by 134 days.

(21) Appl. No.: 15/027,367

(22) PCT Filed: Sep. 30, 2014

(86) PCT No.: PCT/JP2014/076100
§ 371 (c)(1),
(2) Date: Apr. 5, 2016

(87) PCT Pub. No.: WO2015/053131
PCT Pub. Date: Apr. 16, 2015

(65) Prior Publication Data
US 2016/0280018 A1 Sep. 29, 2016

(30) Foreign Application Priority Data
Oct. 10, 2013 (JP) .................. 2013-212857

(51) Int. Cl.
*B60C 23/00* (2006.01)
*B60C 23/04* (2006.01)

(52) U.S. Cl.
CPC ...... *B60C 23/0415* (2013.01); *B60C 23/0416* (2013.01); *B60C 23/0462* (2013.01); *B60C 23/0488* (2013.01); *B60C 23/0489* (2013.01)

(58) Field of Classification Search
CPC ............ B60C 23/0415; B60C 23/0416; B60C 23/0462; B60C 23/0488; B60C 23/0489
See application file for complete search history.

(56) References Cited

U.S. PATENT DOCUMENTS

| 6,112,587 A | 9/2000 | Oldenettel |
| 6,435,020 B1 | 8/2002 | Oldenettel et al. |

(Continued)

FOREIGN PATENT DOCUMENTS

| JP | 2007-153034 | 6/2007 |
| JP | 2011-527971 | 11/2011 |

(Continued)

OTHER PUBLICATIONS

International Preliminary Report on Patentability in PCT/JP2014/076100, dated Apr. 12, 2016.

(Continued)

*Primary Examiner* — Quang Pham
(74) *Attorney, Agent, or Firm* — Greenblum & Bernstein, P.L.C.

(57) ABSTRACT

Each of a plurality of tire air pressure detectors includes an information retention portion that retains one or more pieces of timing information indicating the time at which the tire air pressure detector has rotated to a specific detector angle in a first time band for withholding transmission of a radio wave signal, and a radio wave transmission control portion that transmits one or more of the pieces of timing information retained in the information retention portion to a receiver in a second time band enabling transmission of the radio wave signal. The receiver includes an axle rotation amount reader portion that receives axle rotation amount information generated in each of a plurality of axle rotation detection portions, and a position determination portion that calculates an axle rotation amount at the point in time at which the tire air pressure detectors have rotated to the specific detector angle.

6 Claims, 4 Drawing Sheets

(56) References Cited

U.S. PATENT DOCUMENTS

| | | | |
|---|---|---|---|
| 6,518,877 B1* | 2/2003 | Starkey | B60C 23/004 340/447 |
| 6,960,994 B2* | 11/2005 | Tabata | B60C 23/0416 116/34 R |
| 7,068,157 B2* | 6/2006 | Ikeda | B60C 23/0408 340/442 |
| 8,659,411 B2 | 2/2014 | Fink | |
| 9,061,554 B2 | 6/2015 | Kosugi | |
| 9,139,053 B2 | 9/2015 | Kosugi et al. | |
| 9,180,742 B2 | 11/2015 | Kosugi et al. | |
| 9,193,224 B2 | 11/2015 | Kosugi et al. | |
| 9,227,471 B2 | 1/2016 | Kosugi et al. | |
| 9,823,167 B2* | 11/2017 | Shima | B60C 23/0416 |
| 2004/0090322 A1 | 5/2004 | Tsujita | B60C 23/0416 340/442 |
| 2004/0201466 A1* | 10/2004 | Ikeda | B60C 23/0408 340/442 |
| 2005/0248446 A1* | 11/2005 | Watabe | B60C 23/0416 340/442 |
| 2007/0080795 A1* | 4/2007 | Ichikawa | B60C 23/0413 340/447 |
| 2009/0027183 A1* | 1/2009 | Kvisteroy | B60C 23/0416 340/447 |
| 2010/0060262 A1* | 3/2010 | Dulac | G01P 3/48 324/165 |
| 2010/0231403 A1* | 9/2010 | Bortolin | B60C 23/0416 340/686.1 |
| 2010/0274441 A1* | 10/2010 | Carresjo | B60C 23/0416 701/31.4 |
| 2011/0169627 A1* | 7/2011 | Fink | B60C 23/0416 340/442 |
| 2012/0029767 A1* | 2/2012 | Bailie | B60C 23/0416 701/36 |
| 2012/0112899 A1* | 5/2012 | Hannon | B60C 23/0416 340/445 |
| 2013/0079977 A1* | 3/2013 | Greer | G06F 11/30 701/34.4 |
| 2013/0120566 A1* | 5/2013 | Fujii | G01B 11/25 348/135 |
| 2014/0076040 A1* | 3/2014 | Shima | B60C 23/0416 73/146.5 |
| 2014/0085068 A1* | 3/2014 | Kosugi | B60C 23/0415 340/447 |
| 2014/0150543 A1* | 6/2014 | Shima | B60C 23/0416 73/146 |
| 2015/0142259 A1* | 5/2015 | Mori | B60C 23/0416 701/32.7 |

FOREIGN PATENT DOCUMENTS

| | | |
|---|---|---|
| JP | 2013-103519 | 5/2013 |
| WO | 2013/133307 | 9/2013 |

OTHER PUBLICATIONS

International Search Report in PCT/JP2014/076100, dated Dec. 16, 2014.

* cited by examiner

TIRE POSITION DETERMINATION SYSTEM

TECHNICAL FIELD

The present invention relates to a tire position determination system that determines the position of each tire in a vehicle.

BACKGROUND ART

Patent document 1 discloses a tire position determination system (auto-location function) known in the prior art that automatically determines tire positions to monitor the air pressure of each tire. The system disclosed in patent document 1 includes first sensors (4a to 4d) arranged in wheels (2a to 2d), four second sensors (5a to 5d) corresponding to certain positions of the vehicle, and a measurement system (3) that determines wheel positions. The first sensors transmit signals (S4a to S4d) indicating the wheel positions to the measurement system. The second sensors measure angle positions of the wheels and output the measured values (S5a to S5d). The measurement system determines phase positions (W1a to W3a, W1b to W3b) of the signals from the first sensors based on the measured values and checks whether or not the phase positions are within predetermined tolerable ranges (WTa, WTb) during a predetermined monitor period. This determines the wheel positions.

PRIOR ART DOCUMENT

Patent Document

Patent Document 1: Japanese National Phase Laid-Open Patent Publication No. 2011-527971

SUMMARY OF THE INVENTION

Problems that are to be Solved by the Invention

In patent document 1, the predetermined monitor period is set to determine the tire positions. However, when the vehicle travels at a low speed and the tires slowly rotate, the first sensors may fail to transmit a number of signals that are needed for the tire position determination during the predetermined monitor period. This may hinder the determination of the tire positions. The problem is not limited to patent document 1 and inevitably occurs in a system that determines tire positions using a first sensor and a second sensor. Thus, there is a need to ensure that the first sensor transmits a radio signal used for the tire position determination to the vehicle body.

It is an object of the present invention to provide a tire position determination system that ensures transmission of a radio signal needed for tire position determination from a tire air pressure detector to a receiver.

Means for Solving the Problem

One aspect of the present invention is a tire position determination system that includes a plurality of tire air pressure detectors, a plurality of axle rotation detection units, and a receiver. The tire air pressure detectors are respectively coupled to a plurality of tires. Each tire pressure detector is capable of transmitting a tire air pressure signal, waits to transmit a radio signal in a first period, and is allowed to transmit a radio signal in a second period. The axle rotation detection units are respectively arranged on a plurality of axles. Each axle rotation detection unit detects a rotation amount of the corresponding axle and generates axle rotation amount information. The receiver is included in a vehicle body. The receiver receives a tire air pressure signal from each tire air pressure detector and monitors air pressure of the corresponding tire. Each tire air pressure detector includes an information storage and a radio transmission control unit. The information storage stores one or more pieces of timing information, which indicate a timing when the tire air pressure detector is rotated to a certain detector angle, in the first period, during which the tire air pressure detector waits to transmit the radio signal. The radio transmission control unit transmits one or more pieces of the timing information, which are stored in the information storage, to the receiver in the second period, during which radio signal transmission is allowed. The receiver includes an axle rotation amount reader and a position determination unit. The axle rotation amount reader receives axle rotation amount information generated in each axle rotation detection unit. The position determination unit calculates an axle rotation amount corresponding to a point of time when each tire air pressure detector is rotated to the certain detector angle based on timing information, which is received from the radio transmission control unit of the tire air pressure detector, and axle rotation amount information, which is received from the axle rotation amount reader and corresponds to the timing information, to determine a position of the corresponding tire using the calculated axle rotation amount.

In the above configuration, preferably, the radio signal includes an ID used to identify the tire air pressure detector. The timing information includes information of time from when the tire air pressure detector is rotated to the certain detector angle to when a radio signal is transmitted in the second period, during which radio signal transmission is allowed. The timing information is associated with the ID and allows for identification of the tire air pressure detector.

In the above configuration, preferably, the position determination unit determines the tire air pressure detector that corresponds to the timing information from the tire air pressure detectors based on the ID. The position determination unit uses axle rotation amount information of the axle associated with the determined tire air pressure detector to calculate an axle rotation amount corresponding to a point of time when the tire air pressure detector is rotated to the certain detector angle in accordance with information of time from when the tire air pressure detector is rotated to the certain detector angle to when a radio signal is transmitted in the second period, during which radio signal transmission is allowed.

In the above configuration, preferably, the radio transmission control unit continuously transmits the one or more pieces of timing information in the second period, during which the radio signal transmission is allowed.

In the above configuration, preferably, the radio transmission control unit transmits together one or more pieces of the timing information, which are stored in the information storage, in the second period, during which the radio signal transmission is allowed.

In the above configuration, preferably, when the receiver receives a number of pieces of timing information from the radio transmission control unit of each tire air pressure detector in the second period, during which the radio signal transmission is allowed, the position determination unit calculates one of an average value or an median value from the pieces of timing information.

Effect of the Invention

In the tire position determination system of the present invention, a radio signal needed for tire position determination is transmitted from a tire air pressure detector to a receiver in an assured manner.

EMBODIMENTS OF THE INVENTION

First Embodiment

A first embodiment of a tire position determination system will now be described with reference to FIGS. 1 to 7.

Figure 1:
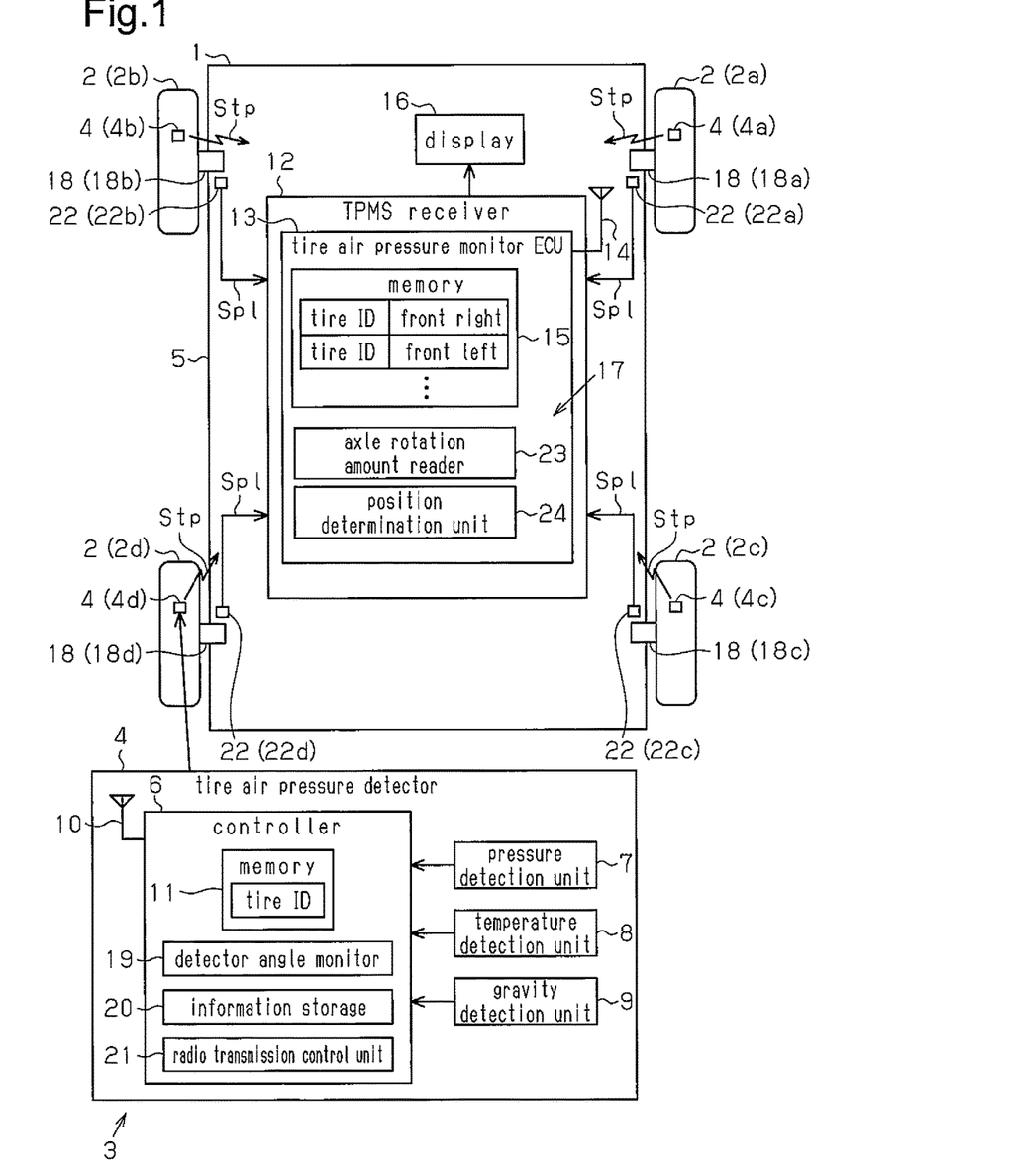
FIG. 1 is a diagram showing the configuration of a first embodiment of a tire position determination system.

As shown in FIG. 1, a vehicle 1 includes a tire air pressure monitoring system 3 (TPMS: tire pressure monitoring system) that monitors tire air pressure of each tire 2 (2a to 2d) or the like. The tire air pressure monitoring system 3 is of a direct-type and includes tire air pressure detectors 4 (4a to 4d: also referred to as tire valves) coupled to the tires 2a to 2d, respectively. Each of the tire air pressure detectors 4a to 4d detects tire air pressure and transmits a tire air pressure signal Stp to a vehicle body 5. Thus, the vehicle body 5 monitors the air pressure of each of the tires 2a to 2d.

Each tire air pressure detector 4 includes a controller 6, which controls operation of the tire air pressure detector 4, a pressure detection unit 7, which detects air pressure of the tire, a temperature detection unit 8, which detects a temperature of the tire, a gravity detection unit 9, which detects gravity generated in the tire air pressure detector 4, and a transmission antenna 10, which allows for radio transmission from the tire air pressure detector 4. The controller 6 includes a memory 11, which stores tire IDs (valve IDs) that are unique to each tire air pressure detector 4. The pressure detection unit 7 is preferably, for example, a pressure sensor. The temperature detection unit 8 is preferably, for example, a temperature sensor. The gravity detection unit 9 is preferably, for example, an acceleration sensor (G sensor). The transmission antenna 10 preferably transmits, for example, a radio signal in an ultra high frequency (UHF) band.

The vehicle body 5 includes a receiver 12 (hereafter, referred to as TPMS receiver) that receives the tire air pressure signal Stp from each of the tire air pressure detectors 4a to 4d and monitors the air pressure of each of the tires 2a to 2d. The TPMS receiver 12 includes a tire air pressure monitor electronic control unit (ECU) 13, which controls operation of the TPMS receiver 12, and a reception antenna 14, which allows the TPMS receiver 12 to receive radio signals. The tire air pressure monitor ECU 13 includes a memory 15, which stores IDs of the tire air pressure detectors 4a to 4d. The IDs of the tire air pressure detectors 4a to 4d are set in correspondence with positions of the tires. For example, the ID of the front right tire air pressure detector 4a is set to ID1, the ID of the front left tire air pressure detector 4b is set to ID3, the rear right air pressure detector 4c is set to ID4, and the rear left air pressure detector 4d is set to ID2. The TPMS receiver 12 is connected to, for example, a display 16 included in an in-vehicle instrument panel or the like.

When detecting rotation of the tire based on a detection signal from the gravity detection unit 9, each tire air pressure detector 4 transmits a tire air pressure signal Stp from the transmission antenna 10 to the vehicle body 5. Alternatively, each tire air pressure detector 4 may regularly or irregularly transmit tire air pressure signals Stp from the transmission antenna 10 to the vehicle body 5. The tire air pressure signal Stp preferably includes, for example, the tire ID, pressure data, temperature data, and the like. Rotation of the tire 2 is determined by checking whether or not the output of the gravity detection unit 9 changes. Additionally, even when determined that the tire 2 is not rotating, tire air pressure signals Stp are transmitted at the same or longer intervals as when the tire 2 is rotating.

When the reception antenna 14 receives a tire air pressure signal Stp from each of the tire air pressure detectors 4a to 4d, the TPMS receiver 12 verifies the tire ID of the tire air pressure signal Stp. When the tire ID is verified, the TPMS receiver 12 checks the pressure data of the tire air pressure signal Stp. When the pressure value is less than or equal to a low pressure threshold value, the TPMS receiver 12 indicates, on the display 16, the tire, which is determined having low pressure, in correspondence with the tire position. The TPMS receiver 12 performs the tire air pressure determination on each received tire air pressure signal Stp to monitor the air pressure of the tires 2a to 2d.

The tire air pressure monitoring system 3 includes a tire position determination function (tire position determination system 17) that automatically determines which one of the front right, front left, rear right, and rear left positions each of the tires 2a to 2d is located, that is, executes so-called auto-location. The tire position determination system 17 determines the positions of the tires 2a to 2d by checking the rotation amount of axles 18 (18a to 18d) when detecting that the tire air pressure detectors 4a to 4d are located at a particular position in the rotation direction.

Figure 2:
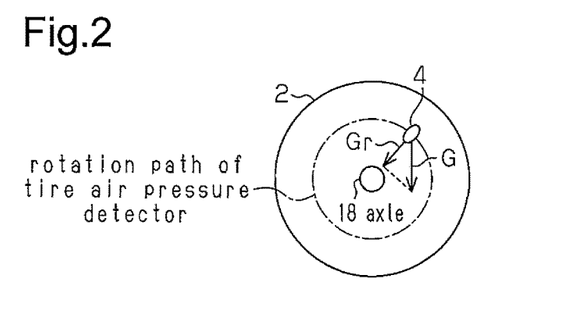
FIG. 2 is a diagram showing a centripetal component of gravity that is detected by a tire air pressure detector.

FIG. 2 shows the centripetal component of gravity detected by a gravity detection unit 9. The gravity detection unit 9 detects a component of gravity G that is directed toward the axle (in radial direction of tire), which defines centripetal gravity component force Gr, as gravity applied to the tire air pressure detector 4. When the tire air pressure detector 4 is located at a peak position (position of "twelve o'clock" or "six o'clock" on the plane of FIG. 2) in a rotation path of the tire 2, the centripetal gravity component Gr is "−1G" or "+1G" if centrifugal force is not taken into account. When the tire air pressure detector 4 is located at the positions of "three o'clock" and "nine o'clock" in the rotation path of the tire 2 on the plane of FIG. 2, the gravity component force Gr is "0G" if centrifugal force is not taken into account.

Figure 3:
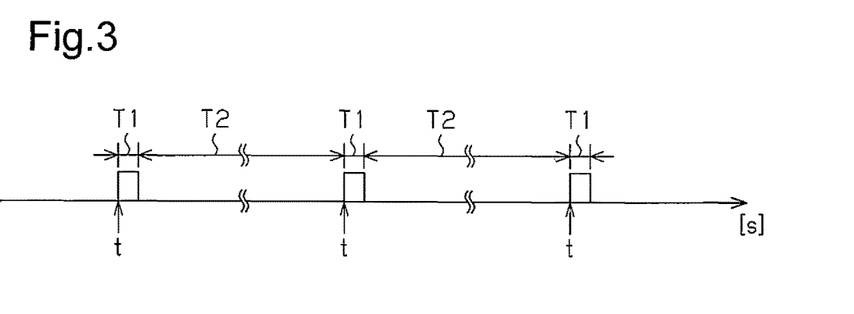
FIG. 3 is a communication sequence chart of the tire air pressure detector.

FIG. 3 shows a schematic communication sequence of radio transmission of a tire air pressure detector 4. Each tire air pressure detector 4 obtains a transmission pattern in which transmission timings t that allow for radio transmission repeatedly appear in a predetermined cycle. A short period "T1" that is from a transmission timing t to when predetermined time elapse is set as a period in which radio transmission is allowed. Preferably, the period T1 is, for example, "one second." The radio transmission is repeated at an interval "T2" between the transmission timings t. The interval T2 is a period during which the tire air pressure detector 4 waits to perform a radio transmission. The interval T2 is preferably, for example, "thirty seconds." Thus, the tire air pressure detector 4 repeatedly performs the radio transmission for one second at thirty-second intervals.

As shown in FIG. 1, each tire air pressure detector 4 includes a detector angle monitor 19, an information storage 20, and a radio transmission control unit 21. The detector angle monitor 19 monitors whether or not the tire air pressure detector 4 is rotated to a certain detector angle. The certain detector angle will be described later with reference to FIGS. 4 and 5. In period T2, during which the tire air pressure detector 4 waits to perform a radio signal transmission, the information storage 20 stores pieces of timing information Dti that indicate the timings when the tire air pressure detector 4 is rotated to the certain detector angle. In period T1, during which radio signal transmission is allowed, when the tire air pressure detector 4 is rotated to the certain detector angle at transmission timing t, the radio transmission control unit 21 transmits a radio signal a number of times. The radio transmission control unit 21 repeats such operation a number of times at predetermined intervals. The detector angle monitor 19, the information storage 20, and the radio transmission control unit 21 are preferably included, for example, in the controller 6.

Figure 4:
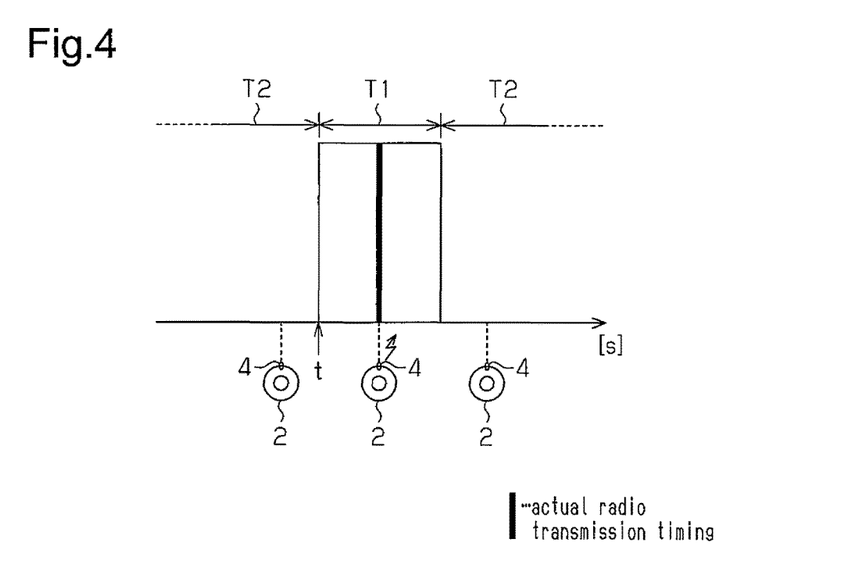
FIG. 4 is a diagram showing radio transmission when the rotation speed of a tire is low.
Figure 5:
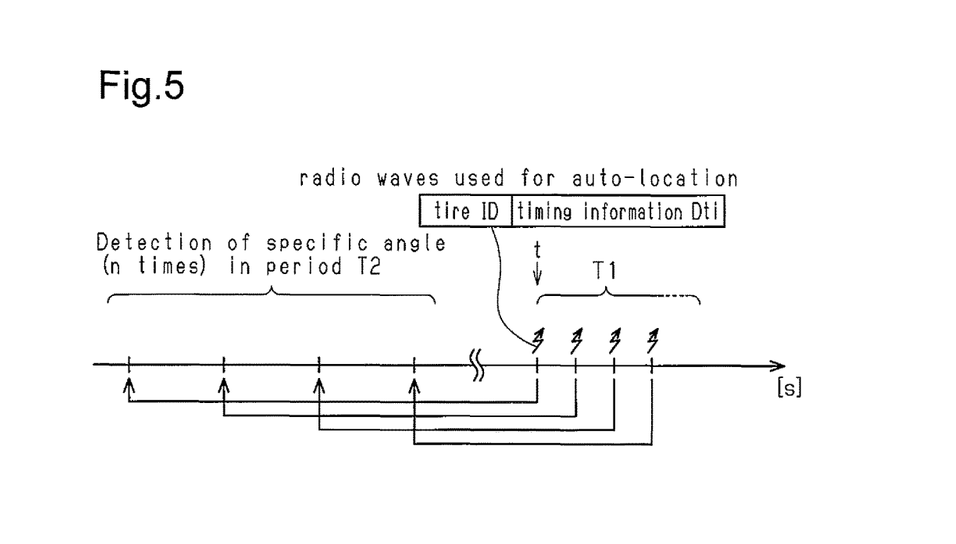
FIG. 5 is a communication sequence chart of auto-location radio signals.

FIGS. 4 and 5 show the operation principle of radio transmission of the tire air pressure detector 4 in the present embodiment. The certain detector angle is preferably, for example, the angle of the tire air pressure detector 4 that corresponds to a pole position in the tire rotation direction. The pole position refers to, for example, the "twelve o'clock" position, the "three o'clock" position, the "six o'clock" position, or the "nine o'clock" position. Further, the certain detector angle is preferably, for example, an angle of the tire air pressure detector 4 that corresponds to a peak position in the tire rotation direction. The peak position refers to, for example, the "twelve o'clock" position or the "six o'clock" position.

As shown in FIG. 4, when period T1, during which radio transmission is allowed, is "one second" and short like in the present example, if the vehicle 1 travels at a low speed and the tires 2 slowly rotate, the tire air pressure detector 4 may fail to transmit a radio signal a number of times in period T1, during which radio transmission is allowed. In such a case, in a system such as that of the present embodiment in which the tire air pressure detector 4 needs to transmit a radio signal a number of times when determining the tire position, the tire position may not be determined.

In this regard, as shown in FIG. 5, the peak position detection of the tire air pressure detector 4 is performed in advance in period T2, during which the tire air pressure detector 4 waits to perform a radio signal transmission. Then, pieces of timing information Dti indicating the timing at which the tire air pressure detector 4 is rotated to the peak position are transmitted together during period T1, during which radio transmission is allowed. The information storage 20 preferably stores, for example, an "n number" of successive pieces of the timing information Dti prior to the transmission timing t. The timing information Dti is the information of the time from when the predetermined angle is detected until radio transmission is allowed. In FIG. 5, four pieces of the timing information Dti are transmitted. The timing information Dti allows, for example, the tire air pressure detector 4 to be identified. The timing information Dti is associated with, for example, the tire IDs (ID1 to ID4) included in radio signals, and the tire IDs (ID1 to ID4) are associated with one of the tire air pressure detectors 4.

In the short period T1 (approximately one second), during which radio transmission is allowed, the radio transmission control unit 21 transmits radio signals. Subsequent to the short period T1, in the sufficiently long period T2 (approximately thirty seconds), the radio transmission control unit 21 does not perform radio transmission. When period T2 ends, the radio transmission control unit 21 repeats the operation that performs radio transmission. Thus, the radio transmission control unit 21 transmits radio signals used for the auto-location. More specifically, at transmission timing t, which allows for radio transmission, the radio transmission control unit 21 successively transmits radio signals including the timing information Dti, which is stored in the information storage 20, at short intervals. The radio transmission control unit 21 repeats such operations at the interval T2. The auto-location radio signal only needs to be a radio signal including the timing information Dti and may be the tire air pressure signal Stp or another radio signal.

As shown in FIG. 1, the TPMS receiver 12 includes a plurality of axle rotation detection units 22 (22a to 22d), an axle rotation amount reader 23, and a position determination unit 24. The axles 18a to 18d include the axle rotation detection units 22 (22a to 22b), respectively. Whenever receiving auto-location radio signals from the tire air pressure detectors 4, the axle rotation detection units 22 (22a to 22d) each detect a rotation amount of the corresponding axle 18 (18a to 18d) and generate axle rotation amount information. The axle rotation amount reader 23 receives the axle rotation amount information from each of the axle rotation detection units 22 (22a to 22d) and provides the axle rotation amount information to the position determination unit 24. The position determination unit 24 calculates the axle rotation amount corresponding to a point of time when each tire air pressure detector 4 is rotated to the certain detector angle, from the axle rotation amount information based on the timing information Dti. The position determination unit 24 determines the tire position in accordance with the calculated axle rotation amount. The axle rotation amount reader 23 and the position determination unit 24 are preferably included in, for example, the tire air pressure monitor ECU 13.

The axle rotation detection units 22a to 22d may include, for example, antilock brake system (ABS) sensors. In this case, the axle rotation amount is preferably expressed by, for example, a pulse count Px. For example, the axle rotation detection units 22a to 22d each detect a plurality (e.g., 48) of teeth arranged on the corresponding axle 18 with a sensing unit of the vehicle body 5 and provide a square wave pulse signal Spl to the axle rotation amount reader 23. When rising edges and falling edges of the pulse signal Spl are detected, the axle rotation amount reader 23 detects 96 pulses (count value: 0 to 95) per rotation of a tire.

Whenever receiving a set of radio signals, the position determination unit 24 calculates an axle rotation amount through an inverse operation. The position determination unit 24 compares a prior set of axle rotation counts with a subsequent set of axle rotation counts, links the ID1 to ID4 to the axles 18a to 18d, and determines the positions of the tires 2a to 2d.

The operation of the tire position determination system 17 will now be described with reference to FIGS. 6 and 7. The TPMS receiver 12 switches to an auto-location mode in a predetermined cycle and performs the tire position determination.

Figure 6:
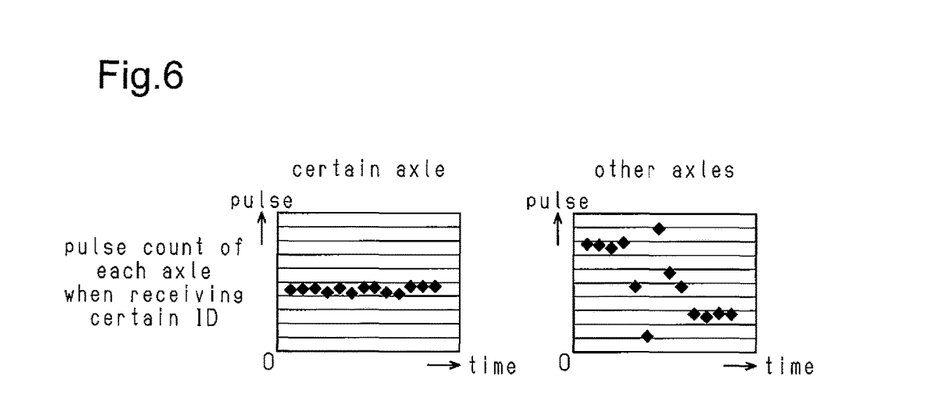
FIG. 6 includes plot graphs showing changes in the number of pulses of two axles when a receiver receives a certain ID.

FIG. 6 shows the principle of the tire position determination of the present embodiment. The tires 2a to 2d (axles 18a to 18d) are each configured to independently rotate and allow the vehicle for turning along curves or the like. This changes the timing at which each of the tire air pressure detectors 4a to 4d reaches a peak position between before and after the vehicle turns. Thus, radio transmission timings of the tire air pressure detectors 4a to 4d also change. More specifically, when the timing information Dti including an ID is received before and after a turning operation, the measured pulse count Px of the axle 18 corresponding to the ID converges on a predetermined value. However, other measured pulse counts Px of the axles 18 not corresponding to the ID change to other values. In the present embodiment, the tire positions are determined on the premise of the principle.

Figure 7:
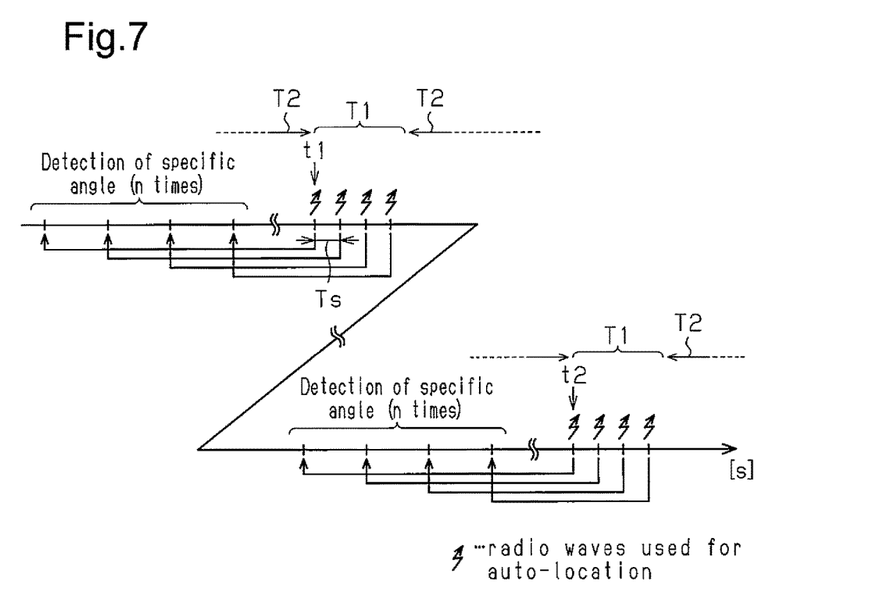
FIG. 7 is a specific communication sequence chart of auto-location radio signals.

As shown in FIG. 7, in period T2, during which the tire air pressure detector 4 waits to perform a radio signal transmission prior to transmission timing t1, the information storage 20 stores a number of pieces of the timing information Dti, which indicate the timing when the tire air pressure detector 4 reaches a peak position, in the memory 11. The information storage 20 stores n (four in FIG. 7) pieces of the timing information Dti. When having stored the maximum amount of timing information Dti and detecting a new piece of timing information Dti, the information storage 20 discards the oldest piece of the timing information Dti and stores the newest piece of the timing information Dti. This updates the data of the timing information Dti that is stored in the information storage 20.

At transmission timing t1, each tire air pressure detector 4 may transmit radio signals during period T1 (e.g., one second). At this time, the radio transmission control unit 21 successively transmits a number of radio signals including the timing information Dti that is the same as the number of pieces of the timing information stored in memory 11 at relatively short intervals. The radio transmission control unit 21 transmits, for example, pieces of the timing information Dti in order from older ones to the TPMS receiver 12. More specifically, the radio transmission control unit 21 transmits a radio signal including the oldest piece of the timing information Dti, a radio signal including the second oldest piece of the timing information Dti, . . . , and a radio signal including the newest piece of the timing information Dti. The interval between radio transmissions, namely, a transmission interval Ts, is set to, for example, 100 ms.

When period T1 ends, each tire air pressure detector 4 again shifts to period T2 (e.g., thirty seconds), during which the tire air pressure detector 4 waits to perform a radio signal transmission, and does not perform radio transmission. In period T2, during which the tire air pressure detector 4 waits to perform a radio signal transmission between the transmission timings t1 and t2, the information storage 20 also stores n pieces of the timing information Dti, which indicate the timings when the tire air pressure detector 4 has reached a peak position, in the memory 11. In the same manner as the case at the transmission timing t1, at a transmission timing t2 of radio signals, the radio transmission control unit 21 successively transmits a number of radio signals including the timing information Dti that are the same as the number of pieces of the stored timing information Dti at relatively short intervals.

When the TPMS receiver 12 is in the auto-location mode, the position determination unit 24 receives the timing information Dti from the tire air pressure detectors 4a to 4d at the transmission timing t1. Based on the received timing information Dti, the position determination unit 24 calculates, for each of the axle rotation detection units 22a to 22d, the axle rotation amount corresponding to a point of time when the tire air pressure detectors 4a to 4d previously reached a peak position from the axle rotation amount that is currently provided from the axle rotation detection units 22a to 22d. The position determination unit 24 determines the tire air pressure detector 4 that corresponds to the timing information Dti from the tire air pressure detectors 4 in accordance with, for example, the information that allows for identification of the tire air pressure detectors 4. The position determination unit 24 uses axle rotation amount information of the axle 18 associated with the determined tire air pressure detector 4 to calculate the axle rotation amount corresponding to a point of time when the tire air pressure detector 4 is rotated to the certain detector angle in accordance with information of time from when the tire air pressure detector 4 is rotated to the certain detector angle until a radio signal is transmitted in the period that allows for radio signal transmission. Alternatively, based on the received timing information Dti, the position determination unit 24 calculates, for each of the axle rotation detection units 22a to 22d, for example, the pulse count Px corresponding to a point of time when the tire air pressure detectors 4a to 4d previously reached a peak position from the pulse count Px that is currently provided from the corresponding axle rotation detection units 22a to 22d. More specifically, when receiving the timing information Dti of the ID1, the position determination unit 24 calculates the pulse count Px of the axle 18a corresponding to a point of time when the right front tire air pressure detector 4a previously reached a peak position. In the same manner, the operation is performed when the timing information Dti of the ID2 to ID4 is received.

In this case, a number of pieces of the timing information Dti is transmitted. Thus, even if the communication condition is unsatisfactory, the TPMS receiver 12 can receive at least one piece of the timing information Dti. Further, when the TPMS receiver 12 receives a number of pieces of the timing information Dti, for example, one or more pieces of the timing information Dti are used to calculate a value of the pulse count Px. The position determination unit 24 stores the calculated value in the memory 15 as the pulse count Px of the corresponding one of the axles 18a to 18d corresponding to the timing information Dti received at the transmission timing t1.

At the next transmission timing t2, when the TPMS receiver 12 receives radio signals including the timing information Dti of the ID1 to ID4, the position determination unit 24 also calculates, for each of the axle rotation detection units 22a to 22d, the pulse count Px corresponding to a point of time when the tire air pressure detectors 4 previously reached a peak position from the pulse count Px that is currently read by the corresponding axle rotation amount readers 23a to 23d. More specifically, when the TPMS receiver 12 receives radio signals including the timing information Dti of the ID1 to ID4, the pulse counts Px of the axles 18a to 18d that are obtained when the tires 2a to 2d previously reached a peak position are calculated.

The position determination unit 24 compares the pulse counts Px of the axles 18a to 18d corresponding to the timing information Dti that is received at the transmission timing t1 and stored in the memory 15 with the pulse counts Px of the axles 18a to 18d corresponding to the timing information Dti that is received at the transmission timing t2 and subsequently calculated to determine the tire positions. More specifically, the position determination unit 24 checks whether the prior and subsequent pulse counts Px of the axle rotation detection units 22a to 22d conform to each other or are within predetermined tolerance to specify the tire positions.

When the tire position determination cannot be completed with a single determination, the position determination unit 24 retries the same process. More specifically, the position determination unit 24 calculates a pulse count Px at the next transmission timing t, compares the calculated pulse count Px with a previous (e.g., preceding) pulse count Px, and determines a tire position. The position determination unit 24 continues the determination process until the tire positions of all four wheels are determined and then completes the auto-location. The auto-location is repeatedly performed in a predetermined cycle.

The configuration of the present embodiment has the advantages described below.

(1) In period T2, during which the tire air pressure detector 4 waits to perform a radio signal transmission, each tire air pressure detector 4 detects a peak position in advance. Further, whenever the peak position is detected, the tire air pressure detector 4 stores a piece of timing information Dti, which indicates the time which the tire air pressure detector 4 reached the peak position. At transmission timing t, the tire air pressure detectors 4 successively transmit the pieces of the stored timing information Dti to the TPMS receiver 12 at the short intervals Ts in period T1, during which radio transmission is allowed. Thus, even when the tires 2 slowly rotate, the tire air pressure detectors 4 can finish the transmission of the timing information Dti to the TPMS receiver 12 in the short period T1, during which radio transmission is allowed. This ensures the transmission of the auto-location radio signals, which are needed for tire position determination, from the tire air pressure detectors 4 to the TPMS receiver 12.

(2) In period T1, during which radio transmission is allowed, a number of pieces of the timing information Dti that have been detected in advance is transmitted in order from older ones to the TPMS receiver 12. This reduces the data amount of the timing information Dti included in a radio signal during a single radio transmission when the tire air pressure detectors 4 transmit radio signals in period T1.

(3) Each of the tire air pressure detectors 4 has a communication sequence in which short periods (periods "T1") that allow for radio signal transmission repeatedly appear between relatively long periods (periods "T2"), during which a tire air pressure detector 4 waits to perform a radio signal transmission. This shortens the period in which the tire air pressure detectors 4 need to transmit radio signals and reduces the power consumed by the tire air pressure detectors 4.

(4) The specific detector angle may be a pole position in the tire rotation direction of the tire air pressure detectors 4. The pole positions of the tire air pressure detectors 4 are easily detected with the gravity detection units 9. Thus, the certain detector angle is easily detected.

(5) A number of pieces of detector angle information may be transmitted in a single radio transmission. Such data processing improves the angle accuracy.

Second Embodiment

A second embodiment will now be described with reference to FIG. 8. In the second embodiment, the transmission logic of the tire air pressure detectors 4 differs from the first embodiment. Thus, the same reference characters are given to those components that are the same as the corresponding components of the first embodiment. Such components will not be described in detail. Only the differences will be described.

Figure 8:
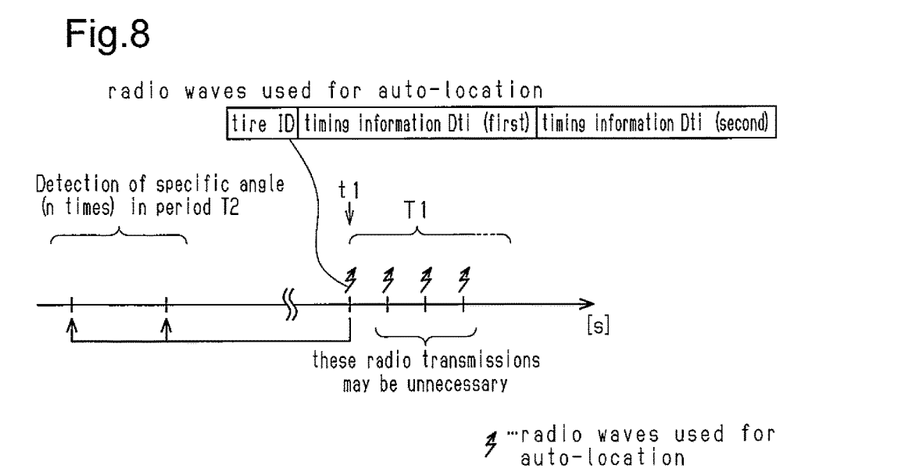
FIG. 8 is a communication sequence chart of auto-location radio signals in a second embodiment.

As shown in FIG. 8, at a transmission timing t of radio signals, the radio transmission control unit 21 transmits a first auto-location radio signal including pieces of timing information Dti that have been detected in period T2 to the TPMS receiver 12. FIG. 8 shows an example of two pieces of the timing information Dti. In the present embodiment, the auto-location radio signal includes, for example, the tire ID and pieces of the timing information Dti.

When receiving the radio signal including pieces of the timing information Dti, the position determination unit 24 calculates the pulse counts Px corresponding to a point of time when the tire air pressure detectors 4 previously reached a peak position with the pulse counts Px that are read by the axle rotation detection units 22a to 22d based on the timing information Dti. The position determination unit 24, for example, selects one or more pieces from the pieces of the obtained timing information Dti and calculates the previous pulse count Px at the peak position from the current pulse count Px based on the selected pieces of the timing information Dti. At transmission timing t2, the position determination unit 24 performs the same calculation. The position determination unit 24 compares the calculated value obtained in the prior transmission time t1 with the calculated value obtained in the subsequent transmission time t2 to specify the tire positions.

FIG. 8 shows an example in which radio transmission is performed several times after the auto-location radio signal is transmitted. However, such radio transmission may be omitted. More specifically, at transmission timing t1, the auto-location radio signal may be transmitted only once. This reduces the number of radio transmissions performed by the tire air pressure detectors 4. Thus, the power consumed by the tire air pressure detectors 4 may be further reduced.

The configuration of the present embodiment has the advantage described below in addition to advantages (1) and (3) to (5) of the first embodiment.

(6) At transmission timing t, which is when radio transmission can be performed, a tire air pressure detector 4 transmits the first radio signal including pieces of the timing information Dti that are detected in advance to the TPMS receiver 12. This reduces the number of transmissions of the timing information Dti performed by the tire air pressure detector 4. Thus, the power consumed by the tire air pressure detectors 4 may be further reduced.

The embodiments are not limited to the above configurations and may be modified as follows.

In the second embodiment, a single radio signal includes a number of pieces of the timing information Dti. However, the second and following radio signals transmitted subsequently may include a number of pieces of the timing information Dti.

In the first and second embodiments, the "n" number of pieces of the stored timing information Dti may differ between the prior transmission timing t1 and the subsequent transmission timing t2.

In the first and second embodiments, the "n" number of pieces of the stored timing information Dti may be variable in accordance with, for example, the vehicle speed or the travel time.

In the first and second embodiments, a predetermined number of pieces of the timing information Dti obtained immediately before the transmission timing t are stored. However, the timing information Dti may be stored at any timing.

In the first and second embodiments, instead of detecting the peak positions during T2, the necessary peak positions may be detected after T2 ends and transmitted during T1.

The first and second embodiment may set a time limit for the auto-location determination process. If the time limit ends when the position determination has not been completed, the process may be forcibly terminated and performed again in next cycle.

In the first and second embodiments, period T1 may be set to different values between when monitoring the tire air pressure and when performing the auto-location. Additionally, T2 may be set in the same manner.

In the first and second embodiments, the time length T1 and the time interval T2 may be set to various kinds of time length.

In the first and second embodiments, the time length T1 and the time interval T2 may be variable and, for example, changed to another value in accordance with a vehicle speed or a travel time.

In the first and second embodiments, the gravity component detected by the tire air pressure detectors 4 may be gravity acting in a direction, for example, orthogonal to the axle direction.

In the first and second embodiments, the axle rotation detection unit 22 may be changed to various detection members (sensor, switch, communication device, etc.) as long as the rotation of the axles 18 can be detected.

In the first and second embodiments, the timing information Dti only needs to indicate the timing when the tire air pressure detectors 4 are rotated to a certain detector angle in period T2.

In the first and second embodiments, a number of pieces of auto-location data in a single period T1 may be processed, for example, to obtain an average, a median, or the like. This improves the accuracy of the position information. For example, when the receiver 12 receives pieces of timing information of the radio transmission control unit 21 of each tire air pressure detector 4 in period T1, during which radio signal transmission is allowed, the position determination unit 24 calculates one of an average or a median from the pieces of the timing information Dti.

In the first and second embodiments, various kinds of processes may be used as the tire position determination process as long as measuring and determining the rotation amount (pulse) of each of the axles 18a to 18d is used in the process when the corresponding tire air pressure detector 4 is located at the certain detector angle.

The invention claimed is:

1. A tire position determination system that determines a position of each tire of a plurality of tires in a vehicle body, the system comprising:
   a plurality of tire air pressure detectors respectively coupled to the plurality of tires, wherein each tire pressure detector is capable of transmitting a tire air pressure signal, waits to transmit a radio signal including the tire air pressure signal in a first period, and is allowed to transmit the radio signal in a second period;
   a plurality of axle rotation detection units respectively arranged on a plurality of axles of the plurality of tires, wherein each axle rotation detection unit detects a rotation amount of the corresponding axle and generates axle rotation amount information; and
   a receiver included in the vehicle body, wherein the receiver receives the tire air pressure signal from each tire air pressure detector and monitors air pressure of the corresponding tire, wherein
   each tire air pressure detector includes:
   a detector angle monitor that monitors whether or not the tire air pressure detector of the corresponding tire is rotated to a certain detector angle;
   an information storage that stores a plurality of pieces of timing information, which indicate a plurality of timings when the tire air pressure detector of the corresponding tire is rotated to the certain detector angle, in the first period, during which the tire air pressure detector of the corresponding tire waits to transmit the radio signal, and
   a radio transmission control unit that transmits the plurality of pieces of timing information, which are stored in the information storage, to the receiver in the second period, during which the radio signal transmission is allowed, and
   the receiver includes:
   an axle rotation amount reader that receives the axle rotation amount information generated in each axle rotation detection unit, and
   a position determination unit that calculates an axle rotation amount corresponding to a point of time when each tire air pressure detector of the corresponding tire is rotated to the certain detector angle based on the plurality pieces of timing information, which is received from the radio transmission control unit of the tire air pressure detector coupled to the corresponding tire, and the axle rotation amount information of the corresponding tire, which is received from the axle rotation amount reader and corresponds to the plurality pieces of timing information of the corresponding tire, to determine a position of the corresponding tire using the calculated axle rotation amount.

2. The tire position determination system according to claim 1, wherein
   the radio signal includes an ID used to identify the tire air pressure detector of the corresponding tire,
   the timing information includes information of time from when the tire air pressure detector is rotated to the certain detector angle to when a radio signal is transmitted in the second period, during which radio signal transmission is allowed, and
   the timing information is associated with the ID and allows for identification of the tire air pressure detector.

3. The tire position determination system according to claim 2, wherein
   the position determination unit determines the tire air pressure detector that corresponds to the plurality pieces of timing information from the tire air pressure detectors based on the ID, and
   the position determination unit uses the axle rotation amount information of the corresponding axle associated with the determined tire air pressure detector to calculate an axle rotation amount corresponding to a point of time when the tire air pressure detector is rotated to the certain detector angle in accordance with information of time from when the tire air pressure detector is rotated to the certain detector angle to when the radio signal is transmitted in the second period, during which radio signal transmission is allowed.

4. The tire position determination system according to claim 1, wherein
the radio transmission control unit continuously transmits the plurality of pieces of timing information in the second period, during which the radio signal transmission is allowed.

5. The tire position determination system according to claim 1, wherein
the radio transmission control unit transmits together the plurality of pieces of timing information, which are stored in the information storage, in the second period, during which the radio signal transmission is allowed.

6. The tire position determination system according to claim 4, wherein
the information storage stores continuously the plurality of pieces of timing information before the second period in the first period, and
the radio transmission control unit continuously transmits the plurality of pieces of timing information, which are continuously stored by the information storage, in the second period.

* * * * *

UNITED STATES PATENT AND TRADEMARK OFFICE
CERTIFICATE OF CORRECTION

PATENT NO. : 10,166,822 B2
APPLICATION NO. : 15/027367
DATED : January 1, 2019
INVENTOR(S) : Kosugi et al.

Page 1 of 1

It is certified that error appears in the above-identified patent and that said Letters Patent is hereby corrected as shown below:

In the Claims

Column 12, Line 30 (Claim 1, Line 38) please change "plurality pieces" to -- plurality of pieces --
Column 12, Lines 36, 37 (Claim 1, Lines 43, 44) please change "plurality pieces" to -- plurality of pieces --
Column 12, Lines 55, 56 (Claim 3, Lines 4, 5) please change "plurality pieces" to -- plurality of pieces --

Signed and Sealed this
Eighteenth Day of June, 2019

Andrei Iancu
*Director of the United States Patent and Trademark Office*